Figure 1:
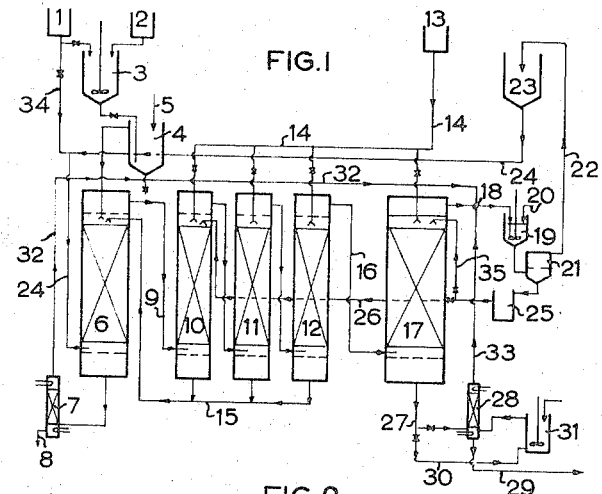

Sept. 19, 1967     A. H. DE ROOIJ     3,342,580
PRODUCTION OF PHOSPHATES FROM PHOSPHATE ROCK
BY SOLVENT EXTRACTION
Filed Nov. 6, 1963

Inventor
Abraham H. de Rooij
By Cushman, Darby & Cushman
Attorneys

United States Patent Office 3,342,580
Patented Sept. 19, 1967

3,342,580
PRODUCTION OF PHOSPHATES FROM PHOSPHATE ROCK BY SOLVENT EXTRACTION
Abraham H. de Rooij, Geleen, Netherlands, assignor to Stamicarbon N.V., Heerlen, Netherlands
Filed Nov. 6, 1963, Ser. No. 321,753
Claims priority, application Netherlands, Nov. 9, 1962, 285,346
5 Claims. (Cl. 71—39)

The present invention relates to a process for preparing phosphoric acid and phosphates from raw phosphates decomposed with nitric acid. Such phosphates as dicalcium phosphate, monocalcium phosphate, alkali phosphates, including ammonium phosphates, or compound NP or NPK fertilizers containing one of the above salts may be prepared according to the invention from basic materials containing tricalcium phosphate such as apatite or otherwise. These materials are hereinafter referred to as "phosphate rock." The preparation process comprises an initial decomposition of the phosphate rock with nitric acid and a subsequent crude separation of the calcium nitrate and phosphoric acid formed in the decomposition.

The decomposition of phosphate rock with nitric acid and the processing of the resulting solution into phosphoric acid or products containing nitrogen and phosphate involving crystallization of calcium nitrate by cooling, and separation of a large part of the resulting calcium nitrate crystals, are well known. One disadvantage of such a process is that the crystallization of calcium nitrate by cooling requires a great deal of energy, especially when a thorough removal of the nitrate is desired. In addition, the phosphoric acid which is obtained by this process is not sufficiently free of the impurities contained in the phosphate rock, such as iron, aluminum, titanium, and fluorine, to be processed as such into dicalcium phosphate of animal-feed grade.

Sulphuric acid and hydrochloric acid have also been proposed for decomposition of the phosphate rock. Thus, in order to obtain pure phosphoric acid when using sulphuric acid or hydrochloric acid for decomposition of the phosphate rock, it has previously been proposed to extract the resulting slurry or solution containing free phosphoric acid with a polar organic solvent which is only slightly miscible with water. Typically, the solvent is a lower aliphatic alcohol, ketone, or ether containing three or more carbon atoms. Mixtures of two or more of these solvents may also be used. In either case, the phosphoric acid is dissolved in the extracting agent while the impurities and the resulting calcium sulphate or calcium chloride remain in the aqueous phase. This procedure gives pure phosphoric acid but it suffers from the disadvantage that the use of sulphuric acid or hydrochloric acid for decomposition produces a large amount of low value products, viz., gypsum and calcium chloride, respectively.

The principal object of the present invention is to provide a process of the type indicated which is free from the disadvantages noted above. Other objects will also be hereinafter apparent.

Broadly stated, the process contemplated herein involves decomposing phosphate rock with nitric acid followed by an extraction of the resulting phosphoric acid with a polar organic solvent or mixture of such solvents having only limited miscibility with water. In this way the advantage of decomposing phosphate rock with nitric acid, i.e., the additional formation of calcium nitrate which is a much more valuable product than gypsum or calcium chloride, is combined with the advantage of recovering phosphoric acid by extraction, namely, a simpler and more economic process for separating the calcium nitrate and phosphoric acid formed in the decomposition of phosphate rock than the known process which is based on crystallization by cooling and separation of calcium nitrate crystals. In addition, the phosphoric acid obtained by the extraction has such a low content of impurities, e.g., fluorine, iron, aluminum, titanium, and silicon compounds, that it can be processed into dicalcium phosphate of animal-feed grade in a much simpler way than has been previously feasible since the difficult removal of fluorine via sodium silicofluoride can be omitted.

It is also possible, by means of the invention, to prepare from the solution containing phosphoric acid and nitric acid, by neutralization, a fertilizer containing nitrogen and phosphate which, from an agricultural point of view, has a more favorable N-P$_2$O$_5$ weight ratio, e.g., 0.6:1 instead of 1:1, than the NP-fertilizers prepared from the phosphoric acid-nitric acid solutions obtained after crystallization by cooling and separating a large part of the calcium nitrate. This is due to the fact that the separation of calcium nitrate and phosphoric acid can be more completely realized by extraction than is economically feasible by crystallizing calcium nitrate.

The phosphoric acid-nitric acid solution recovered by extraction according to the invention is also particularly suitable for processing into so-called liquid fertilizers, i.e., sprayable solutions of phosphates and nitrates. These liquid fertilizers must be practically free of aluminum and iron, as the openings of the fertilizer sprayers otherwise become clogged.

The successful use of the step of extracting the phosphoric acid from the aqueous solution obtained by nitric acid decomposition of phosphate rock using an organic solvent for the extraction is highly unexpected in view of the hazard that the nitric acid-containing solution would attack the organic solvent e.g., by oxidation, nitration, esterification. It has been found, however, that, if the temperature is kept below 60° C. in the extraction, the organic solvent is not or is negligibly attacked. This holds true even in the case where the decomposition of the phosphate rock is effected with an excess of 40–55% by weight of nitric acid and thus the resulting solution contains free nitric acid in addition to free phosphoric acid.

As indicated, the invention involves a crude separation between the calcium nitrate and the phosphoric acid in a solution containing calcium nitrate, phosphoric acid, and nitric acid and obtained by decomposing phosphate rock with nitric acid, by extracting the solution in an extraction system with a polar organic solvent which is only slightly miscible with water or mixture of such solvents. This extraction results in an organic solvent phase in which the acids are dissolved and containing a small amount of calcium nitrate. This phase is discharged from one end or side of the extraction system. An aqueous solution containing the main part of the calcium nitrate originally present and a small amount of phosphoric acid and nitric acid is also formed and this is discharged from the other end or side of the system.

The discharged organic solution containing mainly acids is subsequently processed into phosphoric acid, phosphates, and/or NP-fertilizers, organic solvent removed therefrom being returned to the extraction stage. After neutralization and removal of any residual organic solvent, the discharged aqueous solution containing mainly calcium nitrate is processed by evaporation in any conventional fashion into fertilizer containing calcium nitrate.

Although the process may be carried out batchwise, it is most efficient to oeprate continuously by recycling an amount of organic solvent, continuously supplying the solution containing calcium nitrate and phosphoric acid to the extraction system and continuously discharging the aqueous phase containing mainly calcium nitrate and the organic solvent phase containing mainly phosphoric acid and nitric acid.

Organic solvents which are not only slightly miscible with water and may be used herein are, for example, alcohols, ethers, ketones, such as butyl alcohol, isobutyl alcohol, amyl alcohol, iso-amyl alcohol, methyl isobutyl ketone, or mixtures of any two or more of these materials. Polar organic solvents which are more miscible with water, such as isopropyl alcohol, isopropyl ether, or methyl ethyl ketone, may be added to the less miscible solvents for use herein. Preferably, butyl alcohols are used, as these are relatively cheap and, in addition to having a high solubility with respect to phosphoric acid, they absorb little water and have a low solubility in the aqueous phase.

The extraction is influenced by the volume ratio of the organic solvent to the solution to be extracted. This ratio must be at least 1:1, and use is preferably made of a ratio of 2.5–3 parts by volume of dry organic solvent to 1 part by volume of the solution to be extracted. The higher the free nitric acid content in the solution to be extracted, the more desirable it is to choose a high volume ratio, as the chance of the organic solvent being attacked by the free nitric acid thus becomes smaller.

In the extraction the organic solvent should initially contain a small amount of water (e.g. 2 to 15%, based on the weight of solvent) and nitric acid. This is necessary to prevent the water layer from being freed too completely from nitric acid and thus precipitating phosphates in the water layer. In general, an amount of 0.5–1 kg. of $HNO_3$ in the organic solvent per kilogramme of phosphoric acid to be extracted is sufficient for this purpose.

The phosphate rock is preferably decomposed with 40–55% by weight of nitric acid to give an acid solution containing 135–200 g. of $P_2O_5$ per litre. Decomposition with a more concentrated acid is not profitable and, in fact, is more expensive since this necessitates concentrating by evaporation the acid normally obtained in a nitric acid plant. Additionally, in effecting decomposition with an acid having a concentration in excess of 40–55% there is a chance that calcium nitrate will crystallize out at ambient temperature with the result that conduits and extraction columns may get clogged. Thus, the use of concentrations above 55% are not recommended. Concentrations lower than 40% are also not desirable since at such concentrations, the absorption of the phosphoric acid by the organic solvent is not as complete. As an illustration, if the decomposition of phosphate rock is effected with 55% by weight of $HNO_3$, 99% of the resulting phosphoric acid may be extracted in subsequent extraction of the resulting acid solution with butyl alcohol. This is to be compared with only 88%, under otherwise similar conditions, if the decomposition is effected with 35% by weight of nitric acid.

The recovery of phosphoric acid from the decomposition liquid by means of extraction makes it possible to obtain a relatively pure phosphoric acid, as all kinds of impurities from the phosphate rock, such as $Fe_2O_3$, $Al_2O_3$, $SiO_2$, remain in the aqueous phase. In the case of fluorine it may be said that about 5% evaporates in the decomposition and 90% remains in the aqueous phase in the extraction. Thus only 5% of the original fluorine in the phosphate rock gets into the organic solvent. This means that the phosphoric acid dissolved by the organic solvent can be processed in a simple way into pure alkali or ammonium phosphates or into dicalcium phosphate containing only 0.05–0.10% F. This amply satisfies animal feed requirements.

The composition of the organic solution phase discharged from the extraction system will depend on the nature of the extraction agent and the other extraction conditions. However, in addition to the phosphoric acid, this phase will usually contain some nitric acid (e.g., 4 to 12% by weight based on the weight of solvent phase) and an amount of calcium nitrate corresponding to 5–20% of the amount of calcium originally contained in the phosphate rock. The dissolved phosphoric acid can be removed from this phase, according to the invention, in either of two ways. One of these ways involves a multi-stage extraction with water wherein the first stage involves the formation of an aqueous solution of calcium nitrate and there is formed a solution of phosphoric acid and nitric acid practically free of calcium nitrate. The alternate way comprises a single-stage extraction, in which an aqueous solution is formed containing both the phosphoric acid and the calcium nitrate, the solution being suitable for processing into dicalcium phosphate of animal-feed grade and fertilizers containing ammonium nitrate with or without ammonium phosphate.

Figure 2:
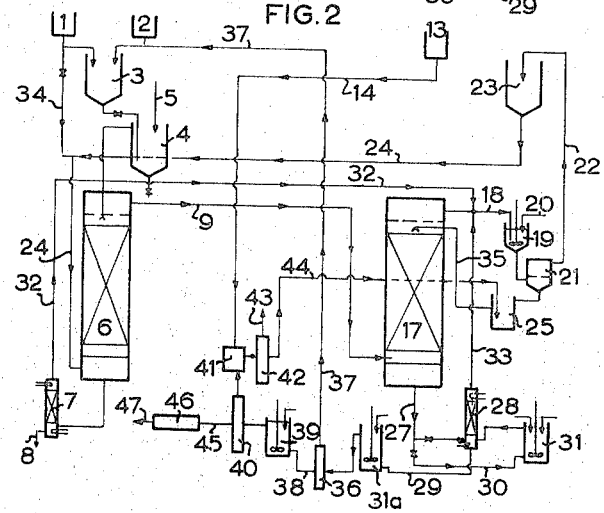

The invention is further described with reference to the accompanying drawing wherein FIGURE 1 is a schematic representation of one embodiment of the invention showing how phosphoric acid is extracted from the organic solvent in a multi-stage system while FIGURE 2 is a schematic representation of another embodiment where this extraction is carried out in a single-stage system. The extraction may be effected in conventional packed or plate-type columns with the liquids in the columns preferably subjected to pulsation.

According to FIGURE 1, nitric acid and phosphate rock are fed from tanks 1 and 2, respectively, into a decomposition reactor 3. Typically, the proportions are such that the phosphate rock is dissolved according to the equation:

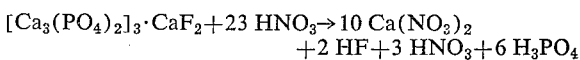

$$[Ca_3(PO_4)_2]_3 \cdot CaF_2 + 23\ HNO_3 \rightarrow 10\ Ca(NO_3)_2 + 2\ HF + 3\ HNO_3 + 6\ H_3PO_4$$

The resulting aqueous solution flows into a settling tank 4 to which, if desired, ammonia may be supplied through conduit 5. In this settling tank all undissolved constituents precipitate, the latter being periodically or continuously discharged. The resulting solution of calcium nitrate and acids in water is passed into the top of an extraction column 6 and is washed in this column with an organic solvent in countercurrent flow. From the bottom of the column 6 an aqueous solution consisting essentially of calcium nitrate but also containing other dissolved impurities, such as Fe and Al, the major part of the fluorine, a small amount of phosphoric acid and nitric acid, is discharged into a stripping column 7. At this point the aqueous solution is freed of any organic solvent which may have been dissolved therein. This amount of solvent is returned through conduit 32 to the main body of organic solvent.

The thus tripped aqueous solution of calcium nitrate is discharged through conduit 8 to an appartus (not shown) for the known preparation of a nitrogen fertilizer consisting mainly of calcium nitrate (15.5% N).

From the top of extraction column 6, the organic solvent containing phosphoric acid, nitric acid and depending on the extraction conditions in column 6 from 5–20% by weight of the calcium nitrate originally present in the aqueous solution, is passed through conduit 9 into a number of extraction columns 10, 11 and 12 arranged in series, where it is washed in countercurrent relation to a limited amount of water. The total amount of water required, which is supplied from tank 13 through conduit 14 and distributed in approximately equal amounts to each of the columns, is, for example, 1 part by volume of water per 4 to 6 parts by volume of organic solvent and the components dissolved therein.

From the bottom of the several columns 10, 11 and 12 a calcium-nitrate solution is discharged, the same being returned to the top of column 6 through conduit 15.

From the top of the last extraction column 12 the organic solvent, which is now practically free of calcium and contains virtually only nitric acid and phosphoric acid, is passed, through conduit 16 into the bottom of an extraction column 17, where it is washed in counter-current relation to a larger amount of water than that applied in the previous columns, for example, 1 part by volume of water per 2 to 4 parts by volume of organic solvent. From the top of column 17 the organic solvent, with any phosphoric acid and nitric acid not yet washed out, is passed, through conduit 18 to a neutralization vessel 19, where its pH is brought to a value of about 3 by means of $NH_3$ supplied through conduit 20. The thus neutralized solvent subsequently flows into separator 21, where a phase separation is effected, resulting in an aqueous bottom layer with the salts (ammonium phosphate and ammonium nitrate) dissolved in it and a top layer of organic solvent with water dissolved in it. This top layer is pumped through conduit 22 to a storage vessel 23 from where it is recycled to extraction column 6 through conduit 24. The organic solvent may be acidified as desired through conduit 34.

The bottom layer from separator 21 is passed into the top of extraction column 10 via a buffer vessel 25 and conduit 26. From the bottom of column 17, the aqueous solution of phosphoric acid and nitric acid is discharged through conduit 27. This solution can be processed into phosphoric acid by first freeing it of residual organic solvent by passing it through stripping column 28, the residual solvent being returned to the main body of organic solvent through conduit 33. The aqueous solution freed from residual solvent at 28 is then passed through conduit 29 to apparatus (not shown) for removing water and nitric acid by distillation.

If it is not desired to separate the phosphoric acid and the nitric acid, for example, if the final object is a fertilizer containing nitrate and phosphate, the salt solution collected in buffer vessel 25 can be passed into the top of column 17 through conduit 35. The concentration of this salt solution influences the concentration of the solution containing phosphoric acid and nitric acid which is to be discharged from the bottom of column 17. In order that as little water as possible need be evaporated in the further processing to fertilizers, it is advantageous to wash the organic solvent in column 17 with a rather concentrated salt solution, e.g., one containing 25% salt by weight. This results in an extraction of about 70% of the free phosphoric acid and 60% of the free nitric acid, the remainder being neutralized in vessel 19 and returned to column 17 as an ammonium salt solution.

The solution leaving the bottom of stripping column 28 containing nitric acid and phosphoric acid but freed from organic solvents, can be used, if desired, after further nitric acid and KCl has been added, to convert the KCl therein into $KNO_3$ according to the equation:

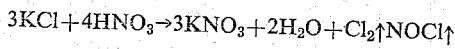

The resulting $KNO_3$ solution, which still contains phosphoric acid, can be neutralized with $NH_3$, evaporated, and granulated to an NPK fertilizer of, e.g., 15% of N, 20% of water-soluble $P_2O_5$, and 27% of $K_2O$. It is also possible to prepare a fertilizer containing ammonium nitrate and ammonium phosphate by passing the solution containing phosphoric acid and nitric acid, discharged from column 17, into neutralization vessel 31 through conduits 27 and 30, freeing the neutralized solution of residual organic solvent in stripping column 28, and subsequently passing the solution, through conduit 29, to evaporating and granulating equipment (not shown).

According to the process illustrated in FIGURE 2— where elements corresponding to those of FIGURE 1 have like numerals, the solution of phosphoric acid, nitric acid, and calcium nitrate in the organic solvent extracted in column 6 in the same way as in the process of FIGURE 1, is passed through conduit 9, directly into the bottom of extraction column 17. In the latter the organic solvent is washed in counter-current relation to such an amount of water supplied through conduit 35 and containing ammonium nitrate and ammonium phosphate, that both the acids and the calcium nitrate are washed from the organic solvent. The further processing of the organic solvent discharged from the top of column 17 viz., neutralization, resulting in a separation into an aqueous bottom layer and a top layer of solvent, is the same as the process described with reference to FIGURE 1.

The solution containing phosphoric acid, nitric acid, and calcium nitrate, which is discharged from the bottom of column 17 and has a composition of, for example, 3 moles of $HNO_3$ and 2 moles of $Ca(NO_3)_2$ per 6 moles of $H_3PO_4$, can be processed in various ways. For example, the solution may be made into dicalcium phosphate virtually free of fluorine and of animal-feed grade, and a nitrogen-phosphate fertilizer (100% water-soluble $P_2O_5$), or to more dicalcium phosphate free of fluorine and a fertilizer containing only ammonium nitrate as a plant food.

The preparation of dicalcium phosphate in addition to a 100% water-soluble nitrogen-phosphate fertilizer may be carried out as follows: The solution discharged from the bottom of column 17 is freed of residual organic solvent in stripping column 28 and then passed through conduit 29 to a neutralization vessel 31a where its pH is raised to about 2 with $NH_3$. Part of the Ca contained therein (about 25% of it) forms, together with phosphate ions, a precipitate of $CaHPO_4.2H_2O$, which is contaminated with precipitated $CaF_2$. This precipitate is filtered off in the filter apparatus 36. The precipitate containing fluorine is returned through conduit 37 to the decomposition of phosphate rock in reactor 3. The solution virtually free of fluorine from the filter apparatus 36 is passed, through conduit 38 to neutralization vessel 39, where its pH is raised to about 6 with $NH_3$, the remainder of the calcium contained in the solution precipitating as $$CaHPO_4 \cdot 2H_2O$$

This precipitate is separated from the remaining solution in filter apparatus 40, washed by suspension in water in tank 41, and separated from this water in filter apparatus 42. The end product, a dicalcium phosphate containing only 0.1% F, is discharged through conduit 43. The wash water is passed, through conduit 44, to buffer vessel 25 and then to column 17 to be used as extraction liquid.

The solution from filter apparatus 40 which is free of calcium and contains only ammonium nitrate and mono-ammonium phosphate, is passed through conduit 45 and concentrated in evaporator 46. Thereafter, this solution is passed through conduit 47, to a granulating device (not shown), the resulting product being a fertilizer containing, for example, 27% N and 21% $P_2O_5$ (100% water soluble).

The variant of this process in which all phosphate is converted into dicalcium phosphate may be carried out as follows: The solution discharged through conduit 27 is passed through conduit 30 to neutralization vessel 31, pre-neutralized with marl in this vessel until the molar $CaO/P_2O_5$ ratio of the solution has become 2, freed of residual organic solvent in stripping column 28, and then passed through conduit 29 to neutralization vessel 31a, where its pH is raised to about 2.5 with $NH_3$. Impure $CaHPO_4 \cdot 2H_2O$ containing fluorine is again precipitated and this is filtered off in the way described above and returned to the decomposition. The pH of the remaining solution is raised to 6 with $NH_3$ in neutralization vessel 39, the remainder of the calcium and phosphate contained in the solution precipitating as $CaHPO_4 \cdot 2H_2O$. This precipitate is filtered off in the way described above, suspended in water, refiltered, and discharged through conduit 43 as a final product containing only 0.05% F as a high-grade animal feed. The mother liquor from filter apparatus 40 which consists of ammonium nitrate solution is concentrated in evaporator 46 and discharged through conduit 47 to a device (not shown) where it is processed in conventional fashion into a fertilizer with about 20% N containing only ammonium nitrate as a nutrient.

The neutralization in neutralization vessel 31a may also be omitted so that a dicalcium phosphate with a slightly higher fluorine content is precipitated in neutralization vessel 39. However, the fluorine content is still so low that the resulting dicalcium phosphate also may be used as an animal feed.

The invention is illustrated, but not limited, by the following examples.

Example 1

This example relates to the preparation of phosphoric acid using the system shown in FIGURE 1.

257 kg. of kola phosphate (composition: 50.3% CaO, 38.9% $P_2O_5$, 3.3% F) were decomposed with 610 kg. of 55% nitric acid. A small amount of ammonia (3.8 kg.) was added to the acid solution in neutralization vessel 4 after which the solution was extracted in column 6 with "butanol" supplied through conduit 24 and consisting of 1600 kg. of butanol, 200 kg. of water, and 183 kg. of 55% nitric acid.

Furthermore, the solution obtained from extraction columns 10, 11 ad 12 and consisting chiefly of calcium nitrate (290 kg., of which 73 kg. was $Ca(NO_3)_2$, 12 kg. butanol, and 28 kg. nitric acid+phosphoric acid+ammonium salts thereof) was also fed to the top of the extraction column 6.

Butanol extract was discharged from the top of the column through conduit 9 in the amount of 2160 kg. comprising 148 kg. of phosphoric acid, 132 kg. of nitric acid, 73 kg. of calcium nitrate, 5 kg. of ammonium nitrate, and 0.4 kg. of fluorine, while 970 kg. of an aqueous solution containing 378 kg. of calcium nitrate, 28.4 kg. of ammonium nitrate, 7.6 kg. of fluorine, 7.4 kg. of phosphoric acid+nitric acid, and 7.0 kg. of butanol, left the bottom of the column.

After removal of the butanol and neutralization, 500 kg. of calcium nitrate with 15.5% N having a composition of $5.2\ Ca(NO_3)_2 \cdot NH_4NO_3 \cdot 10H_2O$ were recovered from the aqueous layer.

The 2160 kg. of butanol extract were extracted with a total of 570 kg. of water in extraction columns 10, 11 and 12 the columns being lined with polyethylene. The thus washed butanol extract (2440 kg.) containing 140 kg. of phosphoric acid, 128 kg. of nitric acid, 2 kg. of calcium nitrate, and 0.2 kg. of fluorine was passed, through conduit 16 to column 17 where it was washed with 1630 kg. of water. The resulting products were 2120 kg. of hydrous butanol containing, besides 230 kg. of water, 6.3 kg. of nitric acid, 2.5 kg. of phosphoric acid, and 0.5 kg. of calcium nitrate on the one hand, and 1950 kg. of an aqueous solution containing 122 kg. of nitric acid and 137 kg. of phosphoric acid on the other. The aqueous layer was freed of dissolved butanol and distilled. The result was a phosphoric acid containing only 5 g. of CaO per kg. of $P_2O_5$.

Example 2

This example relates to the preparation of feed-grade dicalcium phosphate ($CaPHO_4 \cdot 2H_2O$) using the system of FIGURE 2.

As in Example 1, 257 kg. of kola phosphate were decomposed with 610 kg. of 55% nitric acid. 4.5 kg. of $NH_3$ were added to the resulting solution, after which the solution was extracted in column 6 with "butanol" (1230 kg. of nitric acid, 137 kg. of phosphoric acid, 4 kg. of nitric acid). The butanol extract discharged from the top of column 6 amounting to 1688 kg. and comprising 120 kg. of nitric acid, 137 kg. of phosphoric acid, 4 kg. of ammonium nitrate, 86 kg. of calcium nitrate, and 0.3 kg. of fluorine, was extracted in column 17 with extraction liquid supplied through conduit 35 and consisting of a salt solution (380 kg. comprising 174 kg. of water, 136 kg. of ammonium nitrate, 61 kg. of mono-ammonium phosphate, and 8 kg. of butanol) supplied through conduit 21 and water 400 kg.) supplied through conduit 14.

748 kg. of a solution containing 116 kg. of ammonium nitrate, 61 kg. of mono-ammonium phosphate, 85 kg. of phosphoric acid, 29 kg. of nitric acid, 0.3 kg. of fluorine, 8 kg. of butanol were discharged from the bottom of column 17. This solution was freed of butanol by distillation and neutralized with 91.5 kg. of limestone and 16.5 kg. of $NH_3$.

After filtration, washing, and drying, 240 kg. of $CaHPO_4 \cdot 2H_2O$ were obtained having a fluorine content of 0.1% by weight and a total content of iron oxide and aluminum oxide of 0.1% by weight. The filtrate contained 236 kg. of ammonium nitrate from which, after evaporation and addition of limestone, 360 kg. of an ammonium nitrate-containing fertilizer with 23% N were obtained.

The layer of butanol (1720 kg. comprising 91 kg. of nitric acid, 52 kg. of phosphoric acid, 0.8 kg. of calcium nitrate, 24 kg. of ammonium nitrate) was discharged from the top of column 17. This layer was neutralized with 33.6 kg. of $NH_3$ and discharged into separator 21. The supernatant layer of butanol (1230 kg. of butanol and 140 kg. of $H_2O$) was recycled to extraction column 6, the bottom layer of 380 kg. of salt solution being returned to the top of column 17.

Having described the invention above, what is claimed as new is:

1. A process for producing from phosphate rock dicalcium phosphate of animal feed grade comprising (1) decomposing said phosphate rock with an aqueous solution of nitric acid to form an aqueous solution containing calcium nitrate, phosphoric acid and nitric acid and containing 135–200 grams of $P_2O_5$ per liter of solution, (2) separating the acid values of said aqueous solution from said calcium nitrate by extracting said acid values with a polar organic solvent having limited miscibility with water, the volume ratio of polar organic solvent to aqueous solution being by volume at least 1:1 thereby leaving the major portion of calcium nitrate in said aqueous phase, (3) washing the polar organic solvent with a washing medium selected from the group consisting of water and an aqueous solution of phosphates and nitrates to regenerate said polar organic solvent, thereby producing a substantially acid-free polar organic solvent phase and an acid-containing aqueous phase, (4) recycling said substantially acid-free polar organic solvent phase to said extraction in step 2, (5) neutralizing said acid-containing aqueous phase with a lime-containing material to correct the molar $CaO/P_2O_5$ ratio to 2:1 thereby removing impurities therefrom as a precipitate, (6) adding ammonia to said neutralized aqueous phase thereby precipitating dicalcium phosphate and (7) separating said dicalcium phosphate from said ammonia-treated aqueous phase.

2. The process of claim 1 in which the acid containing aqueous phase in step 5 is neutralized to a pH of about 2 and wherein the ammonia is added to the neutralized aqueous phase in step 6 in amounts sufficient to provide a pH of about 6.

3. The process of claim 2 wherein the precipitate from step 5 is separated off and is returned to the decomposition treatment of phosphate rock with nitric acid.

4. The process of claim 1 wherein the polar organic solvent is butanol.

5. The process of claim 1 wherein the ammonia-treated aqueous phase separated from the precipitated dicalcium phosphate in step 7 is evaporated and granulated whereby a fertilizer product containing a member selected from the group consisting of ammonium nitrate and an ammonium nitrate-mono-ammonium phosphate mixture is recovered.

References Cited

UNITED STATES PATENTS

| | | | |
|---|---|---|---|
| 2,778,712 | 1/1957 | Caldwell | 71—39 |
| 2,849,280 | 8/1958 | Le Baron | 71—39 |
| 2,885,265 | 5/1959 | Cunningham | 23—165 |
| 2,914,380 | 11/1959 | Vickery | 23—109 |
| 3,078,156 | 2/1963 | Yamaguchi | 23—109 |
| 3,245,777 | 4/1966 | Chang | 71—39 |

OTHER REFERENCES

Baniel, A., et al.: "Phosphoric Acid by Liquid-Liquid Extraction," in British Chemical Engineering, vol. 4, No. 4 (April 1959), pp. 223–224.

Sauchelli, V.: Chemistry and Technology of Fertilizers, Reinhold Pub. Corp., New York (1960), pp. 323–326.

DONALL H. SYLVESTER, *Primary Examiner.*

A. SCIAMANNA, T. D. KILEY, *Assistant Examiners.*

UNITED STATES PATENT OFFICE
CERTIFICATE OF CORRECTION

Patent No. 3,342,580                      September 19, 1967

Abraham H. de Rooij

It is hereby certified that error appears in the above numbered patent requiring correction and that the said Letters Patent should read as corrected below.

Column 3, line 10, for "oeprate" read -- operate --; line 17, strike out "not"; column 4, line 21, for "there is formed" read -- there is then formed --; column 5, line 64, for that portion of the equation reading NOCl                  read                  + NOCl column 7, line 34, for "ad" read -- and --; column 8, line 1, strike out "kg of nitric acid, 137 kg of phosphoric acid, 4 kg of nitric acid)" and insert instead -- kg of butanol, 140 kg of water, 175 kg of 55% nitic acid) --; line 11, for "400 kg) read -- (400 kg) --.

Signed and sealed this 8th day of October 1968.

(SEAL)
Attest:

EDWARD M. FLETCHER, JR                  EDWARD J. BRENNER
Attesting Officer                         Commissioner of Patents